Aug. 4, 1964 T. A. ROGERS 3,143,108
SYSTEM FOR HEATING LIQUID IN TANKS
Filed June 6, 1960 3 Sheets-Sheet 3

INVENTOR.
THELMER A. ROGERS
BY
Atty.

United States Patent Office 3,143,108
Patented Aug. 4, 1964

3,143,108
SYSTEM FOR HEATING LIQUID IN TANKS
Thelmer A. Rogers, % Lubbock Machine & Supply,
Drawer 1589, Lubbock, Tex.
Filed June 6, 1960, Ser. No. 34,167
3 Claims. (Cl. 126—343.5)

This invention pertains to heating the contents of tanks and more particularly the contents of trailer mounted transport tanks.

The loading and unloading of certain materials is easier if the materials are at an elevated temperature so that they are liquid. Examples of such material are paraffin and lard. Other products, although liquid, are easier to handle at an elevated temperature because they have less viscosity. Examples are peanut oil, cottonseed oil, or corn syrup.

Transport tanks for handling these materials sometimes have cylindrical pipes attached to the outside of the tank. The entire tank is insulated over the pipes. The pipes have an external connection so that they may be connected to a steam source at the transportation terminals. The material can be heated when it is placed in the tank and heated again when it reaches its destination. There is no way to maintain the temperature while in transit, and if it cools during the haul, it requires excessive time to elevate the temperature to the desired point.

This invention contemplates having pans attached to the outside of the tank to provide heat transfer surface between the heating fluid and the tank. There is a completely self-contained steam generator mounted upon the tank. The generator has all the controls and equipment necessary to maintain temperature without any external connections. Liquified petroleum gas is used as fuel as it is readily adaptable for use with automatic controls.

An object of this invention is to provide a system including an improved transport tank heater.

Another object of this invention is to provide a system including heating pans with large heat transfer surfaces.

A further object is to provide a system including unitary structure so that the heating unit is self-contained with the tank and requires no electrical or fuel source from the tractor, or other external source.

A further object is to provide a system to control the heat added to the tank in response to the temperature of the product therein.

A further object is to achieve the above with a system which is adapted for use with multiple compartment tanks.

A further object is to provide a light weight system.

A further object is to provide a system to utilize steam as the heat transfer fluid.

A further object is to provide a system which is automatic in operation.

Still further objects are to achieve the above with a system that is sturdy, compact, durable, simple, and reliable, yet inexpensive and easy to manufacture.

The specific nature of the invention as well as other objects, uses, and advantages thereof will clearly appear from the following description and from the accompanying drawings, in which.

Figure 1:
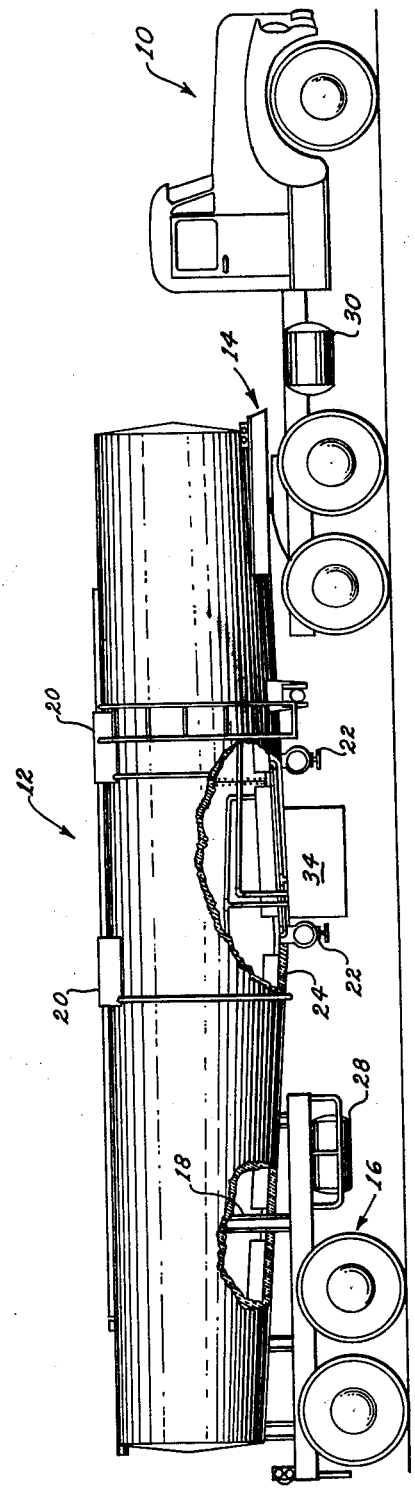
FIG. 1 is an elevational view of the transport tank with the improved heater, partially broken away to show details of construction.
Figure 2:
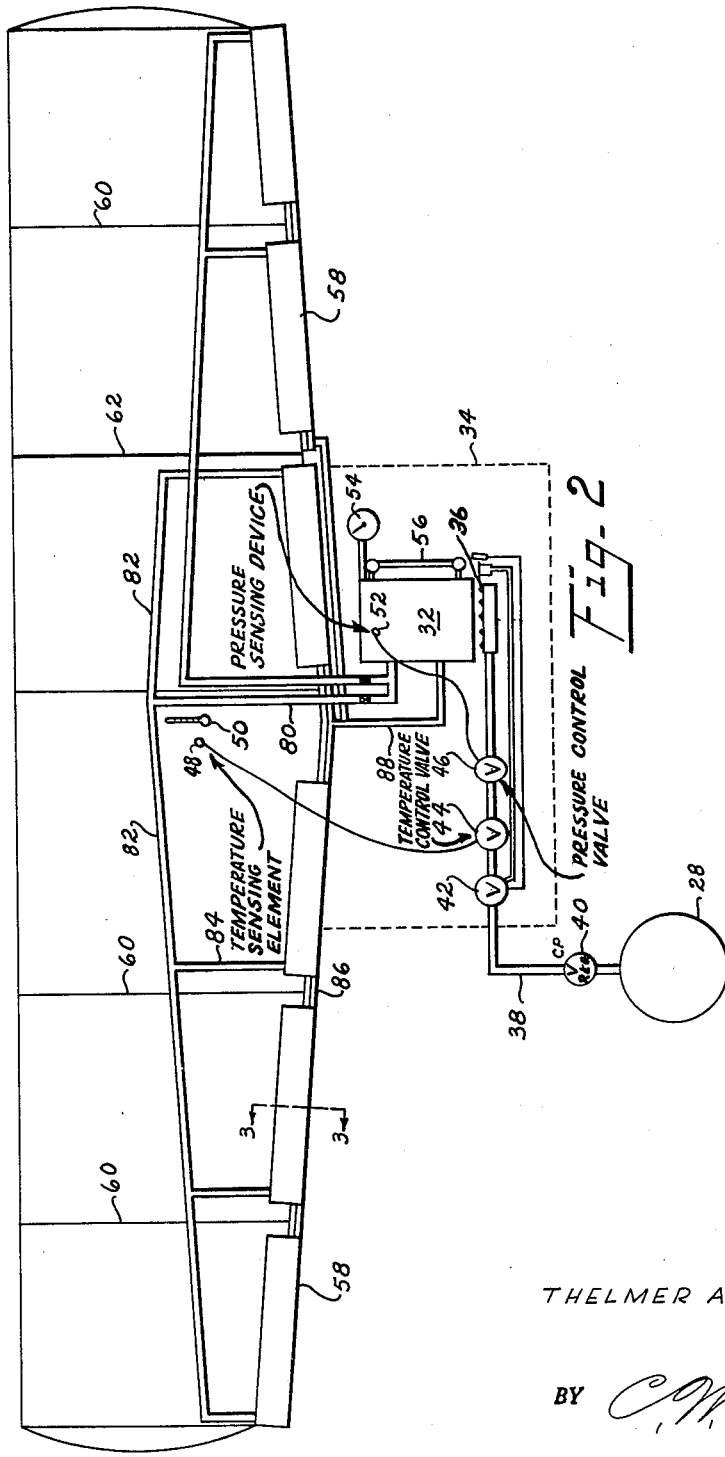
FIG. 2 is a schematic representation of the elements of the invention.

As may be seen in FIG. 1, the unit is to be used with a truck transport having a tractor 10 and trailer tank 12. The tank as illustrated is conventional, having fifth wheel 14 in front to attach it to the tractor and tandem wheel mounting 16 at rear. The tank itself forms the support between the fifth wheel and the tandem wheels. There is a plurality of stiffening rings 18 girding the tank. The tank slopes to a low point about the center for ease in draining the contents.

The illustrated tank has two compartments and, therefore, two places 20 by which they may be filled as well as two product drain valves 22. Standard items on such trailers include a ladder for gaining access to the top and parking wheels. As the entire product is to be at elevated temperatures, a layer of insulation 24 is about the entire tank shell 26.

By this invention a source of fuel 28 is attached to the tank. The source of fuel, a tank or bottle for liquified petroleum gas, is attached to a portion of the frame for the tandem wheels. The fuel tank 28 for heating the product is entirely separate from the fuel tank 30 which is attached to the tractor and is a fuel supply for the tractor. A steam generator or boiler 32 is attached at approximately the low point of the tank 12. The boiler is within a cabinet 34 along with certain controls. The frame for the cabinet 34 forms a support for the boiler. Burner 36 with a pilot is located beneath the boiler and furnishes heat therefor. Also the cabinet forms a windshield to prevent the burner from blowing out. Fuel line or conduit 38 connects the fuel tank 28 to the burner.

Four valves are in the fuel line, in order from the fuel tank: pressure regulator valve 40, pilot valve 42; temperature control valve 44, and pressure control valve 46. The last three of these are cut off valves, i.e. they do not necessarily have an intermediate position but are either on or off.

The pressure regulator valve regulates the pressure from the fuel tank 28 to a pressure which is desired to be at the burner 36. The pilot valve 42 cuts off the fuel in case the pilot is blown out or extinguished for some reason. There is a temperature sensing device which the pilot flame impinges against with a control leading back to the valve 42. A fuel line extends from the valve 42 to the pilot itself. If the pilot is out, the temperature sensing element will grow cold, and the cut off valve 42 will close preventing an accumulation of fuel.

The temperature control valve 44 is regulated by a temperature sensing element 48 which is located within the product itself. Such temperature sensing devices are well-known as are the valves used in connection therewith. Adjustments are provided whereby the temperature of the product may be set, and if it falls below the set point, the valve 44 will open. If it is above a certain set point, the valve 44 closes. Thermometer 50 visually indicates the temperature of the product.

The pressure valve 46 is responsive to the pressure within the boiler. If the pressure in the boiler exceeds a certain value, the valve 46 closes. Devices sensing device 52 and valve 46 are known to the art and not further discussed here. Pressure gauge 54 visually indicates the pressure in the boiler. The gauge 54 reads both above and below atmospheric pressure. Since there is a closed steam circuit, the pressure within the system may be below atmospheric. This is useful in testing for leaks. When the burner is off and the tank cools, the pressure should fall below atmospheric. If it does not, this is some indication that there is a leak in the system.

The boiler is a small boiler with low maximum operating pressure. I choose to limit the maximum operating pressure to 15 p.s.i.g. and below, because various regulations permit simpler construction at these pressures. The boiler itself is a vertical fire tube boiler. The construction of simple boilers is well-known and not further described here. The boiler and steam system is provided with the standard components such as water gauge 56, an air vent, a steam connection leading from the top of the boiler, a condensate return inlet at the bottom of the boiler, and means for adding water.

The steam generator, the fuel supply, and all the controls are completely self-contained and attached to the tank. No external sources of fuel, electrical energy, or controls are necessary from the tractor or from the transportation terminal.

Pans 58, attached to the underside of the tank, are means for thermally conducting the heat from the boiler to the tank contents. The pans are sealed around their periphery to define a volume between the skin of the pan and the shell 26 of the tank. In operation this volume will be filled with steam. A large area of the bottom of the tank will have the steam in direct contact with the shell. A plurality of conventional baffles 60 prevents excessive sloshing of liquid cargo. A separate pan is located beneath the volume as defined between the baffles because of the limited liquid transfer through the baffles.

The composite liquid container 12 includes a plurality of tanks with bulkhead 62 dividing them. A separate steam line branching at the boiler extends to the pans under each compartment. Separate condensate lines return from each battery of pans to the boiler. By closing a valve in the separate lines it is possible to heat only one of the compartments rather than all in the event that one compartment contains a fluid of low viscosity or is empty.

Figure 3:
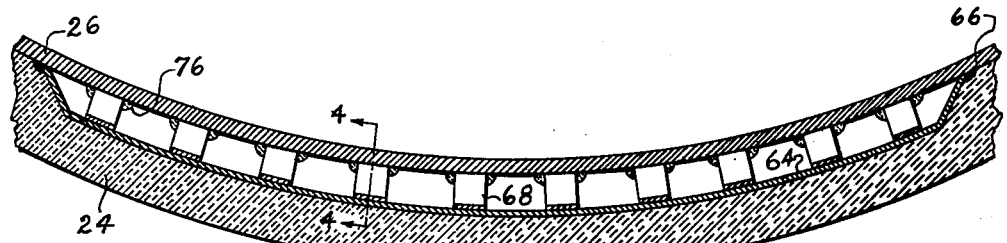
FIG. 3 is a cross sectional view of the pan construction taken on line 3—3 of FIG. 2.
Figure 4:
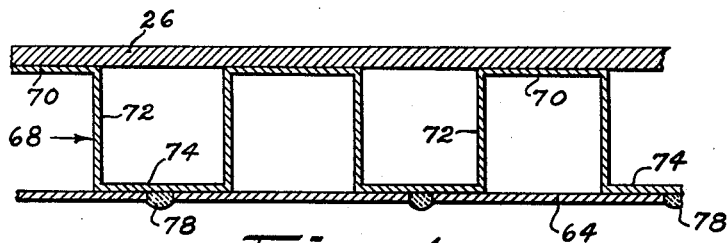
FIG. 4 is an axial sectional view showing the pan construction taken on line 4—4 of FIG. 3.
Figure 5:
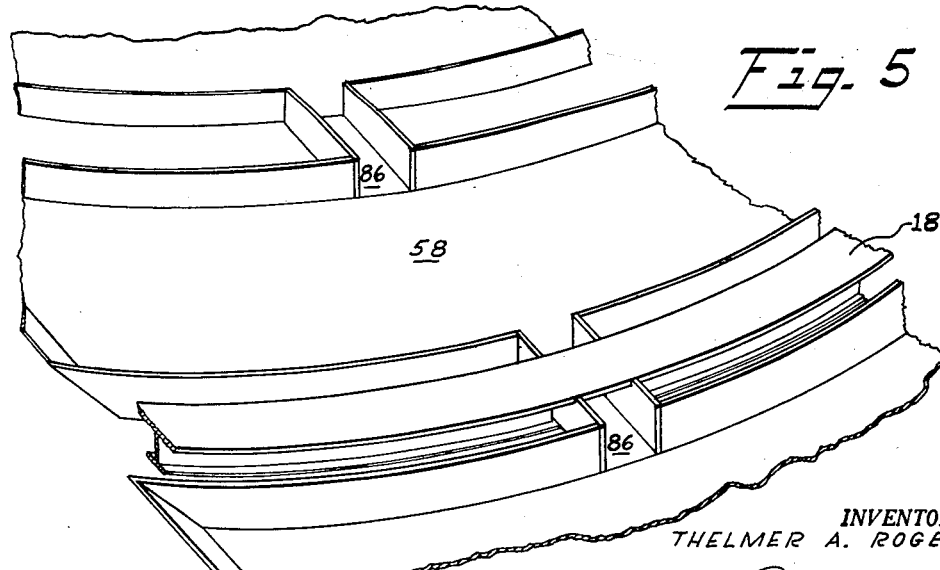
FIG. 5 is a perspective view of the pans with connecting condensate troughs.

The details of the pan construction are seen in FIGS. 3, 4, and 5. The pans are for the purpose of having a large area of heat transfer material in direct contact with the shell 26. This is achieved by having a pan skin 64 attached at its periphery to the shell as by welding 66. A light weight skin 64 is utilized to conserve weight and material. A plurality of spacer members 68 between the shell and skin maintains the skin at a fixed distance from the shell. These spacers consist primarily of straps of metal with a plurality of elements at right angles to each other. A portion of the strap 70 contacts the shell, a portion 72 is normal to the shell and to the skin, and a portion 74 contacts the skin. The spacers are first welded to the shell at 76. Then holes are made in the skin at positions which will be opposite the contacting portion 74 of the spacer. The skin 64 is attached to the spacer by filling these holes with weld metal 78 and thus bonding the skin to the spacer. Steam pipe, or conduit, or line 80 leads from the top of the boiler through a vertical leg to a high point. From the high point to the legs, trunk line 82 slopes downward along the shell of the tank. Vertical legs 84 drop from line 82 to the high point of the pans. Elements 80, 82, and 84 are attached to the outside of the shell by clips or otherwise.

Condensate troughs 86 are provided from one pan to the adjacent lower pan along the bottom slope of the shell. Therefore the condensate drains to the low point of the tank 12. The stiffener rings 18 of the tank are slotted for the passage of the condensate. A trough is located at each stiffener ring, it is not desirable to locate a pan at a point having the stiffener ring. Advantage is taken of the fact that the tank bottom is sloping so that the condensate follows this natural slope. A condensate return 88 connects the low point of the condensate system to the bottom of the boiler 32.

"Steam" is used in this specification and claims in its broad archaic meaning to include the vapor from any heated substance. E.g. if asphalt were to be carried in tank 12, the boiler could be charged with glycerine or ethylene glycol and the asphalt maintained in a fluid state even though the pressure in the boiler does not exceed 15 p.s.i.g.

It will be apparent that the embodiment shown is only exemplary and that various modifications can be made in construction, materials, and arrangement within the scope of the invention as defined in the appended claims.

I claim as my invention:
1. A heated tank system comprising:
   (a) a liquid container,
   (b) wheels mounted on the liquid container, said wheels being a means for transporting the liquid container,
   (c) said liquid container having a pan attached thereto,
   (d) said pan being totally sealed from said container,
   (e) a boiler attached to said container,
   (f) a bottle containing liquified petroleum gas attached to said container,
   (g) a fuel conduit from the bottle containing liquified petroleum gas to the boiler,
   (h) a steam conduit from the top of the boiler to the top of the pan,
   (i) a condensate conduit from the bottom of the pan to the bottom of the boiler,
   (j) a first cut-off valve in the fuel conduit,
   (k) said first cut-off valve being responsive to the pressure within the boiler,
   (l) a second cut-off valve in the fuel conduit,
   (m) said second cut-off valve being responsive to the temperature within the liquid container, and
   (n) a pressure regulator valve in the fuel conduit to lower the pressure to a suitable value.

2. The invention as defined in claim 1 wherein:
   (o) the liquid container is divided into separate compartments,
   (p) a separate heater pan on each compartment,
   (q) the heater pan on each compartment has a separate steam conduit leading from a connection at the top of the boiler to the top of the heater pan, and
   (r) the heater pan on each compartment has a separate condensate line from the bottom of the pan to a connection leading to the bottom of the boiler.

3. A portable heated tank system comprising:
   (a) a transport tank having means for containing liquids,
   (b) said transport tank having ground contacting wheels attached to one end thereof and a tractor attachment means connected to the other end thereof,
   (c) said transport tank attached to a primary mover tractor through said attachment means,
   (d) said transport tank having an undersurface sloping to a low point between said wheels and said attachment to the tractor,
   (e) a storage bottle of liquified petroleum gas attached to said tank,
   (f) a boiler attached to said tank lower than the lowest portion of said tank and a burner associated with said boiler,
   (g) a fuel conduit connecting said bottle to said burner,
   (h) the fuel conduit having a constant pressure regulator therein and a first and a second valve means therein,
   (i) said first valve means responsive to the temperature of the contents of said tank for shutting off the fuel conduit,
   (j) said second valve means responsive to the pressure within said boiler for shutting off the fuel conduit,
   (k) a pan attached to the underside of said tank and including a skin spaced a fixed distance away from the outside surface of said tank, and
   (l) a steam line extending from the top of said boiler to the top of said pan and a condensate line from the bottom of said pan to the bottom of said boiler.

(References on following page)

References Cited in the file of this patent

UNITED STATES PATENTS

| | | |
|---|---|---|
| 1,168,647 | Knox | Jan. 18, 1916 |
| 1,285,304 | Merrill | Nov. 19, 1918 |
| 1,614,107 | Cleary | Jan. 11, 1927 |
| 1,619,663 | Field | Mar. 1, 1927 |
| 1,702,979 | Porter | Feb. 19, 1929 |
| 2,174,333 | Smith | Sept. 26, 1939 |
| 2,181,742 | Rumpf | Nov. 28, 1939 |
| 2,266,134 | Wachowitz | Dec. 16, 1941 |
| 2,317,441 | Chausse | Apr. 27, 1943 |
| 2,538,492 | Anderson et al. | Jan. 16, 1951 |
| 2,548,203 | Deming | Apr. 10, 1951 |
| 2,746,534 | Brooks et al. | May 26, 1956 |
| 2,836,365 | Swenson et al. | May 27, 1958 |
| 2,891,729 | Matthews | June 23, 1959 |

FOREIGN PATENTS

| | | |
|---|---|---|
| 467,751 | Germany | June 28, 1925 |